United States Patent
Hill

(10) Patent No.: US 12,054,188 B2
(45) Date of Patent: *Aug. 6, 2024

(54) SYSTEM AND METHOD FOR ELECTRICALLY ASSISTING IN REMOVAL OF DECEASED HUMANS UP AND DOWN STAIRS AND INTO A VEHICLE

(71) Applicant: Catherine A Hill, Chicago, IL (US)

(72) Inventor: Catherine A Hill, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,938

(22) Filed: Nov. 21, 2022

(65) Prior Publication Data

US 2023/0081979 A1 Mar. 16, 2023

Related U.S. Application Data

(63) Continuation of application No. 16/813,301, filed on Mar. 9, 2020, now Pat. No. 11,535,291.

(Continued)

(51) Int. Cl.
| | |
|---|---|
| *B62B 5/02* | (2006.01) |
| *A61G 17/06* | (2006.01) |
| *B62B 1/00* | (2006.01) |
| *B62B 1/12* | (2006.01) |
| *B62B 1/14* | (2006.01) |
| *B62B 3/02* | (2006.01) |

(Continued)

(52) U.S. Cl.
CPC ............ *B62B 5/02* (2013.01); *A61G 17/06* (2013.01); *B62B 1/002* (2013.01); *B62B 1/12* (2013.01); *B62B 1/14* (2013.01); *B62B 3/02* (2013.01); *B62B 3/04* (2013.01); *B62B 5/0003* (2013.01); *B62B 5/0033* (2013.01)

(58) Field of Classification Search
CPC .... B62B 5/02; B62B 3/02; B62B 3/04; B62B 1/002
See application file for complete search history.

(56) References Cited

U.S. PATENT DOCUMENTS

| | | | |
|---|---|---|---|
| 3,876,022 | A | 4/1975 | Ikarimoto |
| 4,109,740 | A | 8/1978 | Andruchiw |

(Continued)

OTHER PUBLICATIONS https://www.globalindustrial.com/p/material-handling/hand-trucks-dollies/hand-trucks-appliance-stair-climbing/wesco-iftkar-sal-fold-I-stair-climbing-truck-240-lb-cap-microcellular-wheels?infoParam.campaignId=T9F&gclid=Cj0KCQiAqNPyBRCjARIsAKA-WFzTCpfqOnltSP_3c-s7dwB8Cst1MO5yrJ6GCHwVzy6ceQ6dbjsUoBQaAtpWEALw_wcB.

(Continued)

*Primary Examiner* — Brian L Swenson
(74) *Attorney, Agent, or Firm* — Simmons Perrine Moyer Bergman PLC

(57) ABSTRACT

A mortuary human removal system with battery powered stairclimbing capability is disclosed having a mortuary body glide board, riveted to a top side of a commercially available battery powered stairclimbing hand truck. A multi-stage two wheeled prop stand is coupled to an opposing side of the hand truck longitudinal rails, which is designed to create two automatically latching positions of separation between the wheels and the hand truck rail. The shorter separation is used as an aid to safely lifting a human body on the mortuary human removal system to a first height above the ground. The second position is at a predetermined height for use as a fulcrum to tipping the foot end up and into an ambulance, hearse or other vehicle and be automatically folded up as the mortuary human removal system is pushed all the way into the vehicle.

18 Claims, 5 Drawing Sheets

Related U.S. Application Data

(60) Provisional application No. 62/817,633, filed on Mar. 13, 2019.

(51) Int. Cl.
 B62B 3/04 (2006.01)
 B62B 5/00 (2006.01)

(56) References Cited

U.S. PATENT DOCUMENTS

| | | | |
|---|---|---|---|
| 4,369,982 A | 1/1983 | Hein et al. | |
| 5,179,746 A | 1/1993 | Rogers | |
| 5,829,763 A | 11/1998 | Jeavons | |
| 5,871,220 A | 2/1999 | Lombard | |
| 5,938,396 A * | 8/1999 | Audet | B25H 3/00 |
| | | | 414/490 |
| 6,357,063 B1 | 3/2002 | Selby | |
| 8,051,513 B2 | 11/2011 | Reed et al. | |
| 11,020,293 B2 | 6/2021 | Stryker et al. | |
| 11,147,726 B2 | 10/2021 | Stryker et al. | |
| 2012/0160576 A1* | 6/2012 | Anasiewicz | B62B 3/02 |
| | | | 180/19.1 |
| 2013/0154207 A1 | 6/2013 | Sabin et al. | |
| 2013/0181471 A1 | 7/2013 | Tucker | |
| 2014/0084553 A1 | 3/2014 | Carletti | |
| 2018/0021191 A1 | 1/2018 | Lambarth et al. | |
| 2018/0185213 A1 | 7/2018 | Naber et al. | |
| 2019/0047601 A1* | 2/2019 | Murphy | B62B 1/18 |
| 2020/0188199 A1 | 6/2020 | Smink et al. | |
| 2021/0024114 A1 | 1/2021 | Fei et al. | |

OTHER PUBLICATIONS

Wesco LiftKar HD Extended Fold Frame Powered Stair Climbing Hand Truck available at digitalbuyer.com—https://www.digitalbuyer.com/wesco-extended-height-liftkar-hd-straight-frame-725-lb-load-stair-climbing-hand-truck.html.

* cited by examiner

SYSTEM AND METHOD FOR ELECTRICALLY ASSISTING IN REMOVAL OF DECEASED HUMANS UP AND DOWN STAIRS AND INTO A VEHICLE

CROSS REFERENCE TO RELATED APPLICATIONS

The present application is a continuation of the non-provisional patent application having Ser. No. 16/813,301 filed on Mar. 9, 2020, which application claims the benefit of the filing date of provisional patent application having Ser. No. 62/817,633 filed on Mar. 13, 2019 by Catherine A. Hill, which applications are incorporated herein in their entirety by this reference.

FIELD OF THE INVENTION

The present invention generally relates to mortuary services, and more particularly relates to methods and machines for transporting a deceased human up and/or down stairs and into and/or out of a vehicle.

BACKGROUND OF THE INVENTION

Often the first call upon mortuary personnel is to remove a deceased person from a location requiring the use of stairs. Unfortunately, this is sometimes done by sliding the body down stairs or dragging it up stairs. For many reasons, these simple approaches can be less than optimal. Mortuary personnel are often at risk of slips, falls, and injuries to their backs, etc. Also, bereaved observers can be unnecessarily left with a feeling that their deceased loved one has not been treated with proper respect, potentially creating a lasting negative impression of the mortuary providing these services.

Consequently, there exists a need for improved methods and apparatuses for efficiently and safely transporting a deceased person in a controlled and dignified manner over stairs and into a vehicle.

SUMMARY OF THE INVENTION

It is an object of the present invention to improve the process of moving a deceased person over stairs and into a vehicle.

It is a feature of the present invention to effectively utilize a battery powered stairclimbing hand truck which has been augmented and modified.

It is an advantage of the present invention to allow for improved abilities to raise the head and/or the feet of a human strapped to a battery powered stairclimbing hand truck.

The present invention is carried out in an "ergonomic" manner, in a sense that risk of slips, falls and back injuries are eliminated or at least greatly reduced. Additionally, the present invention provides a "dignified" manner of moving a deceased person over stairs, in the sense that a need to slide a deceased person down stairs has been eliminated in many situations.

Accordingly, the present invention is a method of removing, over stairs, an animal from a first location and loading the animal into a vehicle at a second location, the method comprising the steps of:
providing an animal removal system having a battery powered stairclimbing capability, a foot portion with hand truck wheels and a head end having a handle;
placing the animal onto a surface of said animal removal system at a first location;
securing the animal to the animal removal system;
releasing a prop stand release handle;
moving said head end while more vertically disposed with respect to the foot portion;
using a battery powered stairclimbing capability of said animal removal system to move said animal over stairs;
lowering the head end at a second location;
causing said head end to move downwardly and thereby raising said foot portion and rolling said hand truck wheels toward said vehicle;
pushing said animal removal system into the vehicle and causing a battery powered stairclimbing animal removal system prop stand to move to a more parallel orientation with respect to said surface; and
engaging a hand truck handle with features of said vehicle to inhibit the animal removal system from rolling with respect to the vehicle.

Additionally, the present invention is an improved system for moving an animal comprising:
a hand truck having;
a handle end and a base end;
a handle at said handle end;
a first plurality of wheels at said base end;
a ledge at said base end; said ledge being sized, located and configured to set objects on;
said first plurality of wheels having at least four wheels, which in combination, are configured to aid in stair climbing;
a foldable stand, having a proximal end and a distal end, said proximal end of said foldable stand is pivotably coupled to said hand truck, between said handle end and said base end, and is foldable toward said handle end to a first stand orientation; and
a latch configured to selectively hold said foldable stand in a deployed orientation and said first stand orientation.

BRIEF DESCRIPTION OF THE DRAWINGS

The invention may be more fully understood by reading the following description of the preferred embodiments of the invention, in conjunction with the appended drawings wherein.

DETAILED DESCRIPTION

Although described with particular reference to the human form of deceased persons, it should be understood that the systems and methods of the present invention can be implemented for living persons as well.

The systems and methods of the present invention described herein can be viewed as examples of many potential variations of the present invention which are protected hereunder. The following details are intended to aid in the understanding of the invention whose scope is defined in the claims appended hereto. The following description should be viewed as an example of other embodiments of the present invention, which may employ systems and methods which deviate from the details described below, without departing from the spirit and the intended scope of the invention.

Figure 1:
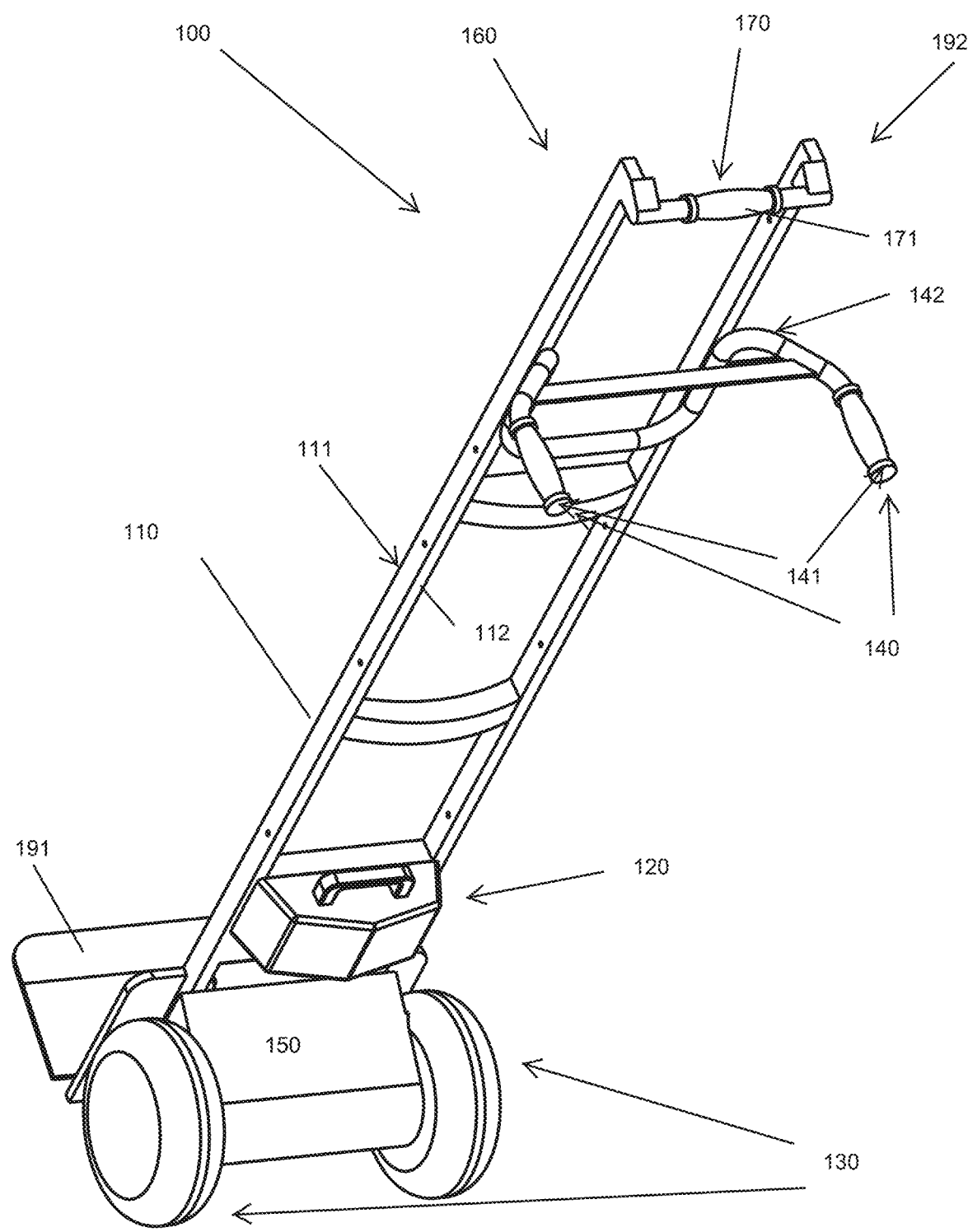
FIG. 1 is a perspective view of a representative battery powered stairclimbing hand truck of an embodiment of the present invention, shown in an unstable and unsupported high intermediate orientation.

Now referring to the drawings wherein like numerals refer to like matter throughout, and more particularly in FIG. 1, there is shown a battery powered stairclimbing hand truck 100 of the present invention, having a foot end 191 and a head end 192, which includes battery powered stairclimbing hand truck longitudinal frame rails 110, which are arranged in a parallel configuration providing the longitudinal structural support between the orthogonal handles 140, with handle flat ends 141 and the hand truck wheels 130. Hand truck handles 140 are shown mounted on a cross braced handlebar 142. Battery powered stairclimbing hand truck longitudinal frame rails 110 each contain a top rail edge 111 and a bottom rail edge 112. Also shown is a battery powered stairclimbing mechanism 150 and a removable battery pack 120. The system shown in FIG. 1 from the removable battery pack (inclusive) and below (toward the hand truck wheels 130) can be quite similar to the prior art Wesco LiftKar SALFold-L Stair Climbing Truck 274155 sold by Global on the web at www.globalindustrial.com. The upper portion of battery powered stairclimbing hand truck 100 contains another very novel portion including and extending from the cross braced handlebar 142, hand truck handles 140 to the head end 192. This portion also contains rail gap spanning handle 170, with central gripping zone 171. Not shown are relocated electronic controls for controlling the battery powered stairclimbing mechanism 150.

Figure 2:
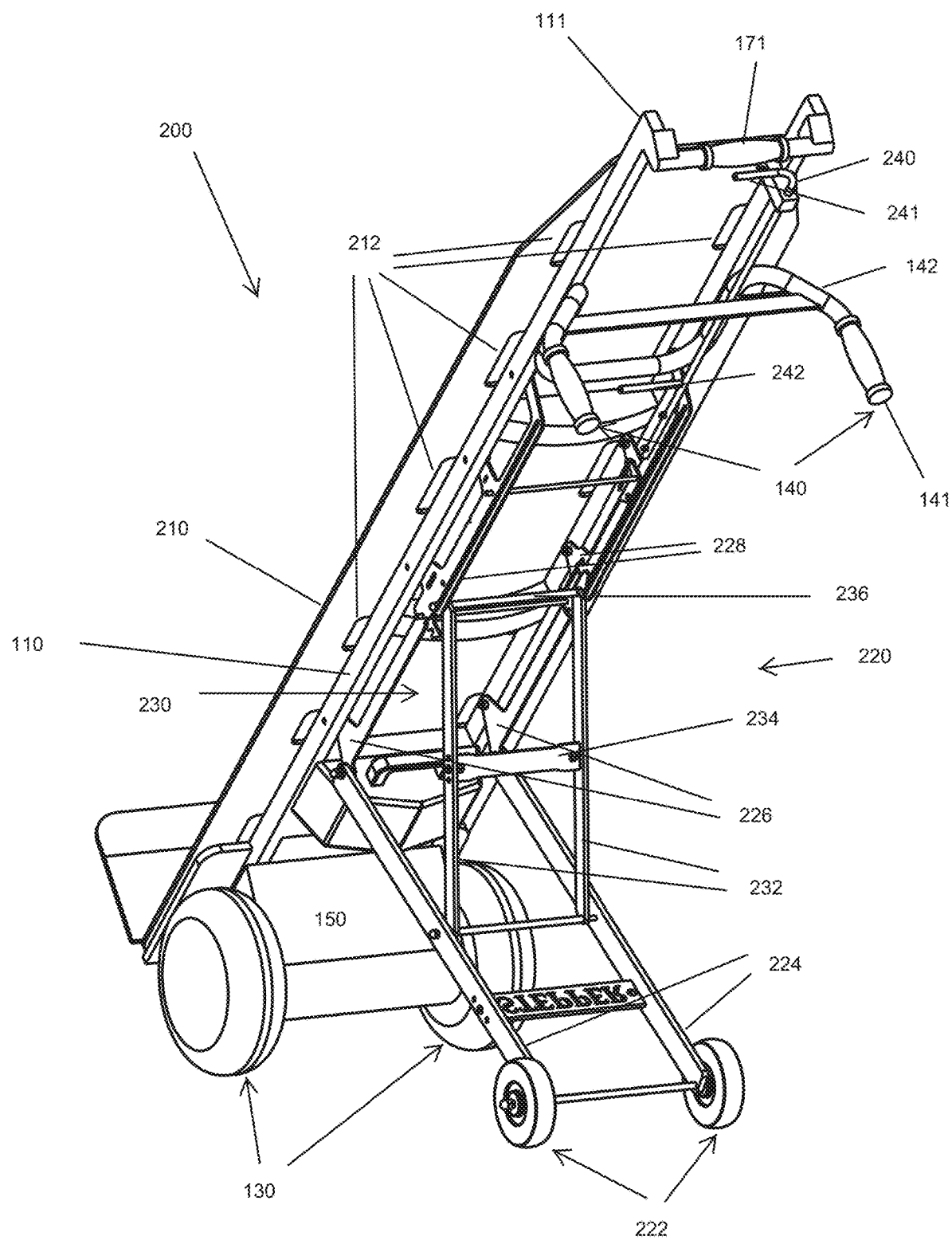
FIG. 2 is a perspective underside view of an embodiment of the present invention in a high intermediate orientation supported by high intermediate configuration of the prop stand.

Now referring to FIG. 2, there is shown a perspective view of the present invention which can be a modification of a Wesco LiftKar SALFold-L Stair Climbing Truck 274155. Mortuary human removal system with battery powered stairclimbing capability 200 is shown having a mortuary body glide board 210 coupled to the battery powered stairclimbing hand truck longitudinal frame rails 110, and being smooth and hard to permit sliding thereon a human body. The system is designed to handle a person over six feet tall and with a weight of 375 pounds. Smaller or larger mortuary body glide boards 210 could be used depending upon the particular needs. In some applications, a mortuary may have a fleet of different sized battery powered stairclimbing hand trucks 100, to optimize ease of use for the size of the body being moved. Mortuary body glide board 210 may be made of any suitable material, including high density polyethylene, which may be riveted or otherwise coupled to the battery powered stairclimbing hand truck longitudinal frame rails 110 or other structural members. Mortuary body glide board 210 is shown with many holes therein to receive straps or other elongated flexible coupling members. Also shown is mortuary battery powered stairclimbing human body removal system multi-stage prop stand, generally designated 220, which includes prop stand elevating arms distal end parallel wheel pair 222 mounted at distal ends of prop stand elevating arms 224, which are pivotally coupled to non-slotted prop stand connecting members 226. Slotted prop stand guiding members 228 are coupled to the battery powered stairclimbing hand truck longitudinal frame rails 110, as are non-slotted prop stand connecting members 226.

One prop stand elevating arms 224 and one non-slotted prop stand connecting members 226 could be portions of a single unified structure or in other embodiments could be separate and distinct members. Disposed between prop stand elevating arms 224 and slotted prop stand guiding members 228 is collapsible support member 230 with parallel support member arms 232, support member central cross member 234 and translating slot guided end member 236. Prop stand elevating arms 224 may be of a fixed length or could be made to be telescopic, folding, expandable or otherwise having an adjustable length characteristic to accommodate different heights of vehicles. The mortuary battery powered stairclimbing human body removal system multi-stage prop stand 220 is configured to have multiple intermediate stages where the mortuary human removal system with battery powered stairclimbing capability 200 can be stopped and restarted, with the aid of prop stand release handle 240 by engaging the release gripping portion 241, during a task of tipping it up from a horizontal position to a vertical position, to allow the person doing the tipping up to use different muscles and utilize different manners of grasping the mortuary human removal system with battery powered stairclimbing capability 200. When the mortuary human removal system with battery powered stairclimbing capability 200 is in the full vertical position (not shown) the intermediate release handle 242 may be easier to manipulate. This multi-stage process of tipping up provides for multiple benefits including the possibility of reducing injuries of mortuary personnel, especially allowing lifting a loaded mortuary human removal system with battery powered stairclimbing capability 200 ergonomically by using ones legs from horizontal to the lower intermediate position.

Figure 4:
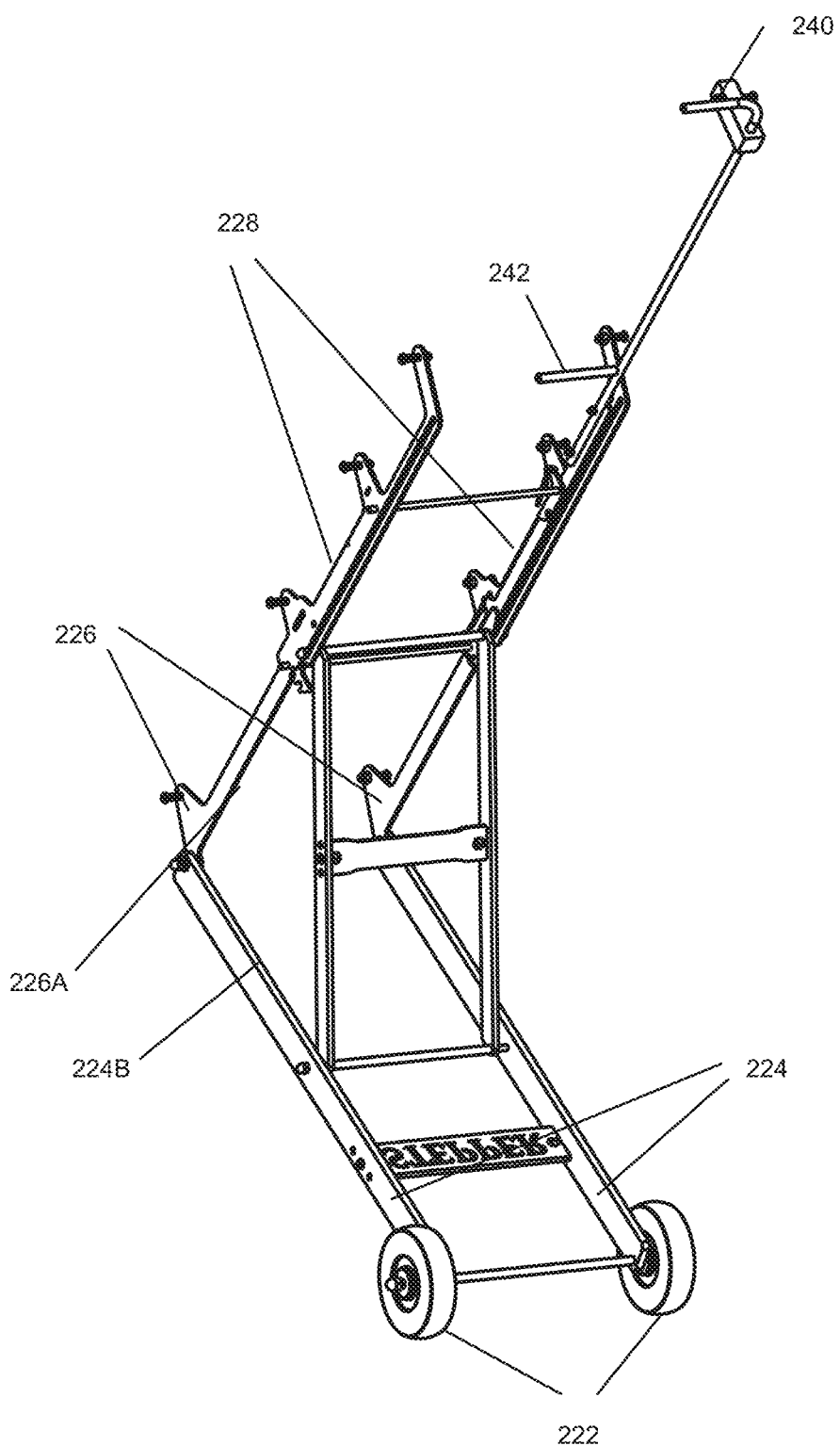
FIG. 4 is a view of portions of the present invention of FIGS. 2 and 3 which have been specially made to work with structure shown in FIG. 1.
Figure 5:
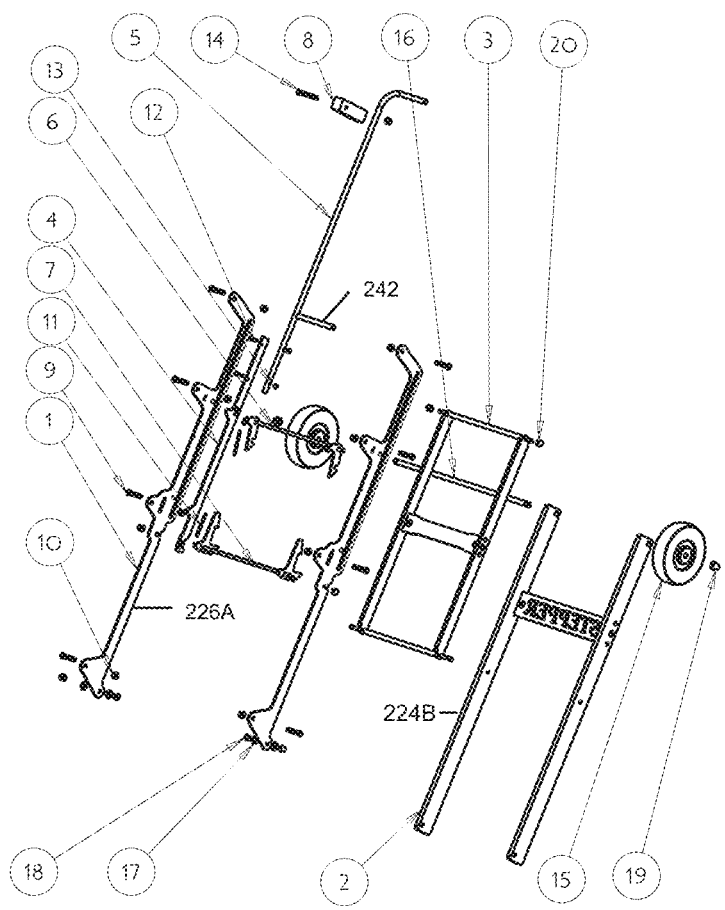
FIG. 5 is an exploded view of the parts shown assembled in FIG. 4.

Now referring to FIG. 5, there is shown an exploded view of the parts of the present invention shown assembled in FIG. 4 where 1 is a side frame, aka slotted prop stand guiding members 228, 2 is main leg assembly, which is aka mortuary battery powered stairclimbing human body removal system multi-stage prop stand 220, which includes prop stand elevating arms 224. Also shown is 3, which is a brace leg assembly aka collapsible support member 230. Lock slide bar 4 is shown as well as lock release handle 5, aka prop stand release handle 240. Also shown is cam lock top assembly 6, BTM posit cam lock 7, handle guide block 8, bolt 9, lock nut 10, spring 11, bolt 12, nut 13, bolt 14, wheel 15, aka prop stand elevating arms distal end parallel wheel pair 222, axel rod 16, washer 17, bolt 18 and nuts 19 and 20.

One particularly helpful aspect of the method of the present invention is achieved during a scenario where the present invention is lifted from a collapsed configuration which is horizontal and has vertical height comparable to the height of a stretcher in its collapsed configuration. In this configuration, the brace leg assembly 3 is in its orientation most parallel with the side frame 1 and the main leg assembly 2. Then central gripping zone 171 of rail gap spanning handle 170 is grasped and lifted ergonomically using your legs to the low intermediate angular position (not shown) where the angle $\alpha$ between connecting member outside edge 226A and elevating arm inside edge 224B is acute and then the lifting person shifts stance and gripping manner (with a pivoting of the wrist or other adjustment based upon personal preference) and moves it to the high intermediate angular orientation, shown in FIGS. 2 and 3. At this orientation, the elevating arm inside edge 224B of prop stand elevating arms 224 are still at an acute angle $\alpha$ with respect to connecting member outside edge 226A.

Figure 3:
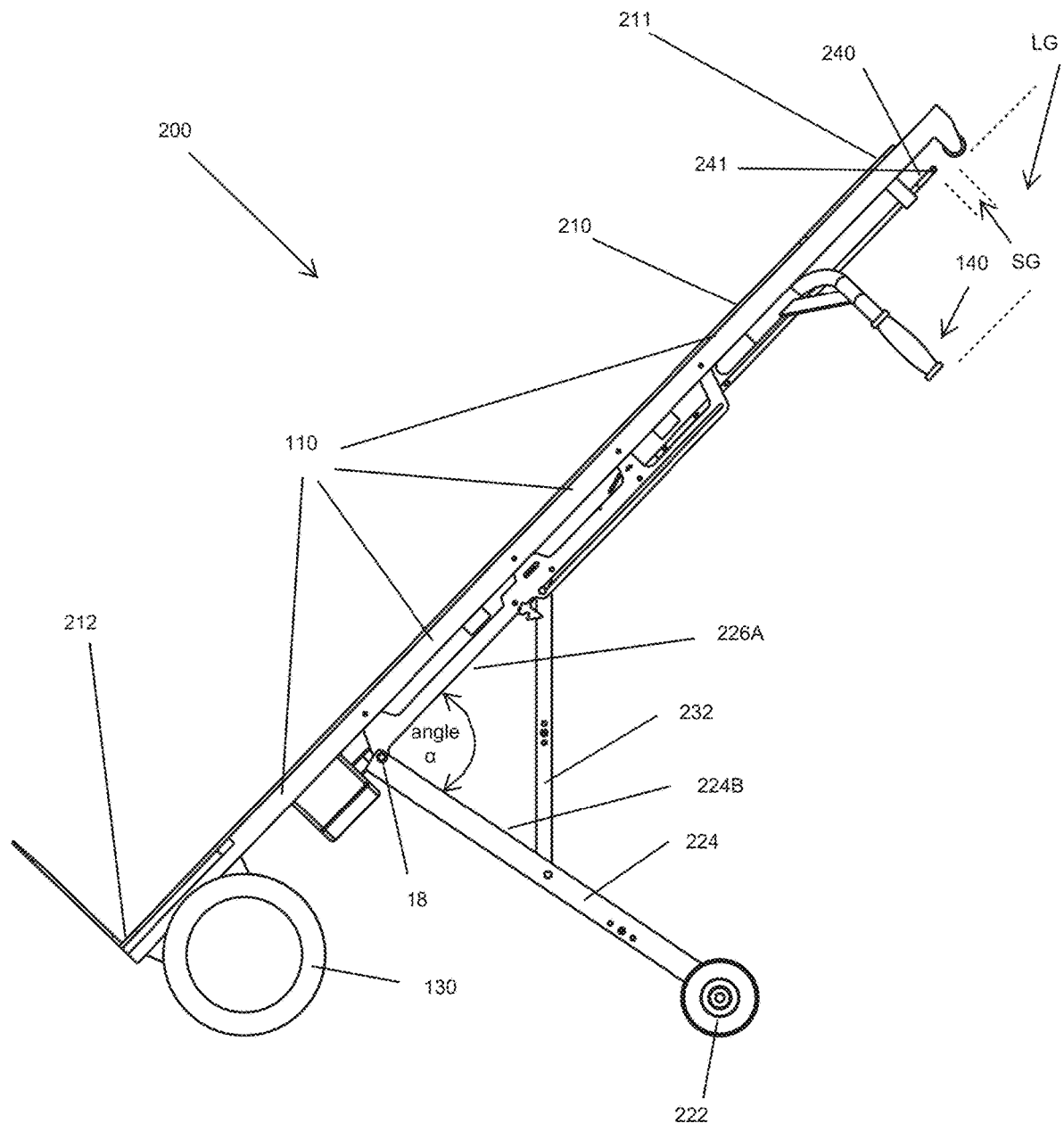
FIG. 3 is a side view of the configuration of FIG. 2.

From this positon, as shown in FIG. 3, several things can be done:
1) the head end can be further tipped up with the weight of the system solely on the wheels 130 and closer to vertical for traversing stairs, with electric assistance;
2) rolled on four wheels without the need to fully support all weight not supported by the hand truck wheels 130;
3) by pushing down on the head end 192 causing a tipping up of the foot end so that only the wheels 222 are on the ground and the body on the mortuary body glide board 210 is again substantially horizontal but now elevated, above the ground. In this configuration, the system can be rolled on the prop stand elevating arms distal end parallel wheel pair 222 so that the hand truck wheels 130 enter a service vehicle, such as an ambulance, hearse, etc. Once the hand truck wheels 130 are inside the service vehicle and being supported by a floor portion of the service vehicle, the system is loaded therein by releasing the prop stand release handle 240 which allows the parallel support member arms 232 to pivot and slide toward the head end 192, this permits the person loading the mortuary human removal system with battery powered stairclimbing capability 200 to push it into the ambulance or hearse in a way somewhat similar to how an automatically collapsing cot is loaded into an ambulance. In this situation, the prop stand elevating arms 224 are automatically folded into the same configuration as when the system 200 was in its horizontal flat configuration at the start of this sequence described above. In this configuration, the hand truck handles 140 are preferably aligned with holes or other surface features on the floor of the service vehicle to restrict rolling of the mortuary human removal system with battery powered stairclimbing capability 200 during the vehicular transport phase. If no surface features are on the floor of the service vehicle, the handle flat portion 141 may be made of a pliable material which provides substantial friction with respect to a typical floor of a service vehicle.

When it is time to remove the mortuary human removal system with battery powered stairclimbing capability 200 from the hearse, it can be done as follows:
1) it is pulled partially out;
2) then the prop stand release handle 240 is pulled, allowing the prop stand elevating arms distal end parallel wheel pair 222 to be free to drop;
3) when the mortuary battery powered stairclimbing human body removal system multi-stage prop stand 220 is fully deployed and latched into its higher intermediate position, before the hand truck wheels 130 are outside of the hearse, the head end 192 can be lowered;
4) the hand truck wheels 130 can be pulled beyond the end of the hearse;
5) then the hand truck wheels 130 can be lowered to the ground; and
6) the loaded mortuary human removal system with battery powered stairclimbing capability 200 can be rolled on the hand truck wheels 130 and the prop stand elevating arms distal end parallel wheel pair 222.

The angle α alpha in this embodiment is always acute when the mortuary battery powered stairclimbing human body removal system multi-stage prop stand 220 is fully deployed, fully retracted or at intermediate locations. There are two gaps labeled in FIG. 3. Small Gap (SG) is the gap between the central gripping zone 171 and the release gripping portion 241. This gap should be shorter than the lengths of a typical finger for an adult from the palm to the fingertips. This is done so that the prop stand release handle 240 can be actuated when person operating the system 200 has a hand situated to grasp the central gripping zone 171. The Larger Gap (LG) is gap between the same central gripping zone 171 and a plane defined by the handle flat portion 141 where the LG is preferably large enough that the person operating the system will not scrape their fingers on the ground when in the process of grasping the central gripping zone 171 when the handle flat portions 141 are on the ground. In other words, LG is greater than SG.

The dimensions of the present invention can be changed depending upon the particular application for which the system is being designed, but in one embodiment the distance from glide board top end 211 and the glide board bottom end 212 is approximately 72.5 inches, the SG is between approximately 1.125 inches to 2.25 inches and the LG is approximately 8.75 inches. The distance between the point of contact on the mortuary body glide board 210 of the longitudinal axes of the hand truck handles 140 measured to the glide board bottom end 212, which is might be commonly be referred to as "handle height", is preferably 63.75 inches, plus or minus 2 inches.

The precise implementation of the present invention will vary depending upon the particular application.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred and/or exemplary embodiment thereof

I claim:

1. A method of removing, over stairs, an animal from a first location and loading the animal into a vehicle at a second location, the method comprising the steps of:
providing an animal removal system having a battery powered stairclimbing capability, a foot portion with hand truck wheels and a head end having a handle;
placing an animal onto a surface of said animal removal system at a first location;
securing the animal to the animal removal system;
releasing a prop stand release handle;
moving said head end while more vertically disposed with respect to the foot portion;
using a battery powered stairclimbing capability of said animal removal system to move said animal over stairs;
lowering the head end at a second location;
causing said head end to move downwardly and thereby raising said foot portion and rolling said hand truck wheels toward said vehicle;
pushing said animal removal system into the vehicle and causing a battery powered stairclimbing animal removal system prop stand to move to a more parallel orientation with respect to said surface; and
engaging a hand truck handle with features of said vehicle to inhibit the animal removal system from rolling with respect to the vehicle.

2. The method of claim 1 further comprising the steps of:
after said step of securing the animal to said animal removal system, and where said animal removal system is a dead animal removal system, perform the following steps:
releasing said prop stand release handle;
grasping at said head end and lifting the head end to a first intermediate angular orientation, where the prop stand elevating arms orientation is latched at a predetermined angle with respect to the animal removal system, where a latching mechanism is automatically engaged to maintain said first intermediate angular orientation;

pausing the lifting at said first intermediate angular orientation;

re-grasping said head end;

releasing said prop stand release handle;

lifting the head end to a second intermediate angular orientation where the latching mechanism is automatically engaged; and stopping the lifting at said second intermediate angular orientation.

3. The method of claim 1 further comprising the steps of:

after said step of lowering the head end at a second location and before the step of causing said head end to move downwardly and thereby raising said foot portion up to roll said hand truck wheels in said vehicle, perform the following steps:

releasing a prop stand release handle;

grasping at said head end and lifting the head end to a first intermediate angular orientation, where the prop stand elevating arms orientation is latched at a predetermined angle with respect to the animal removal system, where a latching mechanism is automatically engaged to maintain said first intermediate angular orientation;

pausing the lifting at said first intermediate angular orientation;

re-grasping said head end;

releasing said prop stand release handle;

lifting the head end to a second intermediate angular orientation where the latching mechanism is automatically engaged; and stopping the lifting at said second intermediate angular orientation.

4. The method of claim 3 further comprising the steps of:

after said step of securing the animal to said animal removal system, perform the following steps:

releasing a prop stand release handle;

grasping at said head end and lifting the head end to a first intermediate angular orientation, where the prop stand elevating arms orientation is latched at a predetermined angle with respect to the animal removal system, where a latching mechanism is automatically engaged to maintain said first intermediate angular orientation;

pausing the lifting at said first intermediate angular orientation;

re-grasping said head end;

releasing said prop stand release handle;

lifting the head end to a second intermediate angular orientation where the latching mechanism is automatically engaged; and stopping the lifting at said second intermediate angular orientation.

5. The method of claim 4 wherein said step of grasping at said head end comprises grasping a rail gap spanning handle at a central gripping zone.

6. The method of claim 5 further comprising lengthening said prop stand elevating arms.

7. The method of claim 6 wherein an angle $\alpha$ is defined by a connecting member outside edge and an elevating arm inside edge; and where said angle $\alpha$ is one of ninety degrees and an angle less than ninety degrees.

8. The method of claim 7 wherein said prop stand elevating arms distal end parallel wheel pair are coupled by an axel rod which is sized and configured to be stepped on, without bending to, before performing said step of causing said head end to move downwardly.

9. The method of claim 7 wherein in said step of releasing said prop stand release handle is performed by grasping a release gripping portion and translating said release gripping portion along a line parallel to a longitudinal axis of said animal removal system.

10. The method of claim 9 wherein said step of translating said release gripping portion is performed by pulling said release gripping portion with a hand which is also engaging said central gripping zone.

11. An animal removal system comprising:

a battery powered stairclimbing hand truck having a head end and a foot end; a prop stand, disposed at a second side of said battery powered stairclimbing hand truck and having;

a pivoting parallel plurality of prop stand elevating arms, each having an elevating arm edge;

a prop stand guiding member, together with a prop stand connecting member having a connecting member outside edge;

where an angle $\alpha$ is defined by said connecting member outside edge and an elevating arm inside edge;

said prop stand coupled at a proximal end to said battery powered stairclimbing hand truck, said prop stand further having a wheel pair disposed at a distal end of said prop stand;

said prop stand and said battery powered stairclimbing hand truck being operable when said angle $\alpha$ is one of ninety degrees and less than ninety degrees and when said prop stand wheel pair are closest to a top rail edge, said prop stand wheel pair are closest to said head end; and a latching mechanism, and a prop stand release handle, configured in combination to provide an automatic latching system where once said prop stand reaches a first predetermined angular orientation, said prop stand is latched at said first predetermined angular orientation until said prop stand release handle is released.

12. The animal removal system of claim 11 further comprising a rail gap spanning handle having a central gripping zone.

13. The animal removal system of claim 12 further comprising a release gripping portion disposed on said prop stand release handle.

14. The animal removal system of claim 13 further comprising a hand truck handle having a handle portion.

15. The animal removal system of claim 14 wherein:

a first gap exists between the central gripping zone and the release gripping portion, and a second gap exists between the central gripping zone and a plane defined by the handle portion where the second gap is larger than said first gap.

16. The animal removal system of claim 15 wherein said pivoting parallel plurality of prop stand elevating arms has a fixed length.

17. The animal removal system of claim 16 further comprising an axel rod connecting said prop stand elevating arms distal end parallel wheel pair.

18. The animal removal system of claim 17 wherein said animal removal system is a dead animal removal system and said axel rod is free of any planar regions between said prop stand wheel pair, which is configured to be stepped on to inhibit rolling of said prop stand wheel pair.

* * * * *